United States Patent
Khoreva et al.

(10) Patent No.: US 12,272,123 B2
(45) Date of Patent: Apr. 8, 2025

(54) TRAINING A GENERATOR FOR GENERATING REALISTIC IMAGES USING A SEMANTICALLY SEGMENTING DISCRIMINATOR

(71) Applicant: Robert Bosch GmbH, Stuttgart (DE)

(72) Inventors: Anna Khoreva, Stuttgart (DE); Edgar Schoenfeld, Tuebingen (DE); Vadim Sushko, Stuttgart (DE); Dan Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 348 days.

(21) Appl. No.: 17/911,987

(22) PCT Filed: Aug. 20, 2021

(86) PCT No.: PCT/EP2021/073121
§ 371 (c)(1),
(2) Date: Sep. 15, 2022

(87) PCT Pub. No.: WO2022/043203
PCT Pub. Date: Mar. 3, 2022

(65) Prior Publication Data
US 2023/0134062 A1 May 4, 2023

(30) Foreign Application Priority Data
Aug. 24, 2020 (DE) .................... 10 2020 210 711.4

(51) Int. Cl.
G06N 3/08 (2023.01)
G06V 10/764 (2022.01)
(Continued)

(52) U.S. Cl.
CPC .......... *G06V 10/774* (2022.01); *G06V 10/764* (2022.01); *G06V 10/776* (2022.01); *G06V 20/58* (2022.01); *G06V 20/70* (2022.01)

(58) Field of Classification Search
CPC . G06T 2207/20084; G06T 2207/20081; G06T 11/00; G06T 7/11; G06T 11/60;
(Continued)

(56) References Cited

U.S. PATENT DOCUMENTS 10,803,301 B1 * 10/2020 Farivar .................. G06N 3/045
2020/0311869 A1 * 10/2020 Reaungamornrat ...... G06T 5/60
2021/0004810 A1 * 1/2021 Lind .................... G06Q 20/389

FOREIGN PATENT DOCUMENTS

DE     102018204494 B3    8/2019

OTHER PUBLICATIONS

International Search Report for PCT/EP2021/073121, Issued Dec. 10, 2021.

(Continued)

*Primary Examiner* — Quan M Hua
(74) *Attorney, Agent, or Firm* — NORTON ROSE FULBRIGHT US LLP; Gerard A. Messina

(57) ABSTRACT

A method for training a generator for images from a semantic map that assigns to each pixel of the image a semantic meaning of an object to which this pixel belongs. The images generated by the generator and the at least one real training image that belong to the same semantic training map are supplied to a discriminator. The discriminator ascertains a semantic segmentation of the image assigned to it, the segmentation assigning a semantic meaning to each pixel of this image. From the semantic segmentation ascertained by the discriminator, it is evaluated whether the image supplied to the discriminator is a generated image or a real training image.

11 Claims, 3 Drawing Sheets

(51) Int. Cl.
  *G06V 10/774* (2022.01)
  *G06V 10/776* (2022.01)
  *G06V 20/58* (2022.01)
  *G06V 20/70* (2022.01)

(58) Field of Classification Search
  CPC . G06T 11/001; G06T 7/70; G06T 5/70; G06T 17/00; G06T 19/20; G06T 2207/30196; G06T 7/74; G06T 2207/20012; G06T 5/60; G06T 5/80; G06T 7/75; G06F 18/214; G06V 10/82; G06V 10/774; G06V 10/764; G06V 10/771; G06V 10/12; G06V 2201/03; G06V 10/25; G06V 30/19173; G06V 30/274; G06N 3/045; G06N 3/08; G06N 3/0475; G06N 3/04; G06N 3/0464; G06N 3/084; G06N 3/047; G06N 3/063; G06N 3/088; G06N 5/01; G06N 20/10; G06N 20/20
  See application file for complete search history.

(56) References Cited

OTHER PUBLICATIONS

Schonfeld et al., "A U-Net Based Discriminator for Generative Adversarial Networks," 2020 IEEE ICVF Conference on Computer Vision and Pattern Recognition (CVPR), IEEE, 2020, pp. 8207-8216. <https://openaccess.thecvf.com/content_CVPR_2020/papers/Schonfeld_A_U-Net_Based_Discriminator_for_Generative_Adversarial_Networks_CVPR_2020_paper.pdf> Downloaded Sep. 14, 2022.

Chen et al., "Classification Constrained Discriminator for Domain Adaptive Semantic Segmentation," 2020 IEEE International Conference On Multimedia and Expo (ICME), 2020, pp. 1-6.

Liu et al., "Learning to Predict Layout-to-Image Conditional Convolutions for Semantic Image Synthesis," 33rd Conference on Neural Information Processing Systems (NEURIPS 2019), Vancouver, Canada, 2019, pp. 1-15.

Uricar et al., "Yes, We Gan: Applying Adversarial Techniques for Autonomous Driving," Cornell University, 2020, pp. 1-16.

* cited by examiner

TRAINING A GENERATOR FOR GENERATING REALISTIC IMAGES USING A SEMANTICALLY SEGMENTING DISCRIMINATOR

FIELD

The present invention relates to the training of a generator for realistic images that can in turn be used for the training of image classifiers.

BACKGROUND INFORMATION

Approximately 90% of the information that a human driver needs to drive a vehicle in street traffic is visual information. For the at least partly automated driving of vehicles, it is therefore indispensable to correctly evaluate the content of image data, of any modality, that are recorded during the monitoring of the environment surrounding the vehicle. Of particular importance for the driving task is a classification of the image data as to which traffic-relevant objects are contained in the data, such as other traffic participants, roadway markings, obstacles, and traffic signs.

Corresponding image classifiers have to be trained with training images that are recorded in a multiplicity of traffic situations. Providing the training images is comparatively difficult and expensive. Traffic situations that rarely occur in reality may be underrepresented, in terms of numbers, in the data set with the training images, in such a way that the image classifier cannot optimally learn how to correctly classify them. In addition, a large amount of manual work is necessary in order to label the training images, or their pixels, with associated target class assignments (ground truth).

Therefore, in addition synthetically generated training data are also used, which are generated by a generator on the basis of generative adversarial networks, or GANs. Such a generator for radar data is described in German Patent Application No. DE 10 2018 204 494 B3.

SUMMARY

According to the present invention, a method is provided for training a generator for images.

The term "image" is not limited to static camera images, but also includes for example video images, radar images, lidar images, and ultrasonic images.

The images to be generated can be realistic for example in relation to a specific application. Here, "realistic" can mean in particular that in a subsequent processing, such as during the training of an image classifier, the images can be used in the same way as images recorded with physical sensors. Realistically generated images can in particular be used for example to enrich a reservoir of real training images, recorded with sensors and subsequently labeled, for an image classifier. Therefore, for better readability the images to be generated are referred to in the following as "realistic images" or as "realistically generated images."

According to an example embodiment of the present invention, the generator generates the realistic images from a semantic map. This semantic map assigns, to each pixel of the realistic image to be generated, a semantic meaning of an object to which this pixel belongs. Thus, not just any random realistic image is generated, but rather an image that reflects a situation specified in the semantic map. In this way, the semantic map can designate for example a traffic situation having various street lanes, lane boundaries, traffic signs, traffic participants, and further objects.

According to an example embodiment of the present invention, for the method, real training images and associated semantic training maps that assign a semantic meaning to each pixel of the respective training image are provided. For each real training image, there is thus a semantic training map. Conversely, for each semantic training map there is at least one real training image, because a semantically identical situation may for example have been recorded with different lightings or other imaging parameters. The semantic training maps may be obtained for example by manual labeling of the real training images.

With the generator to be trained, realistic images are generated from at least one semantic training map. For the same at least one semantic training map, at least one real training image is ascertained. For training the generator, a discriminator is used. Here, the realistic images generated by the generator and the at least one real training image are supplied to the discriminator.

The discriminator is designed to ascertain a semantic segmentation of the image supplied to it that assigns a semantic meaning to each pixel of this image. From the semantic segmentation ascertained by the discriminator, it is evaluated whether the image supplied to the discriminator is a realistically generated image or is a real training image. This evaluation can take place in the discriminator itself and/or in a functional unit separate therefrom. The evaluation does not have to be trainable, but can also take place according to a static rule.

According to an example embodiment of the present invention, the realistic images generated by the generator, the at least one real image, and the at least one mixed image are supplied to the discriminator. Generator parameters that characterize the behavior of the generator are optimized, with the goal that the realistic images generated by the generator are misclassified by the discriminator as real images.

According to an example embodiment of the present invention, simultaneously, or also alternating herewith, discriminator parameters that characterize the behavior of the discriminator are optimized with the goal of improving the accuracy in the distinguishing between realistically generated images and real images. The discriminator is thus trained such that after the evaluation of the semantic segmentation it supplies, a realistically generated image is classified as a realistically generated image, and a real training image is classified as a real training image.

The use of a discriminator that not only distinguishes in binary fashion between real training images on the one hand and realistically generated images on the other hand, but rather supplies a complete semantic segmentation of the image supplied to it, has various advantages.

The stated binary distinguishing is always related globally to the entire image. In contrast, the semantic segmentation takes place at the local level of the individual pixels. Thus, for example sub-regions of the image can be identified by the discriminator as being without doubt parts of the real training image, while other sub-regions of the image are identified as parts of a realistically generated image. Such contradictions do not have to be resolved until the subsequent evaluation.

For example, an image, in response to a situation in which a portion of its pixels identified as part of a realistically generated image exceed a specified threshold value, can be evaluated as a realistically generated image. Conversely, an image, in response to a situation in which a portion of its pixels identified as part of a real training image exceeds a specified threshold value, can be evaluated as a real training image. Any number of levels of gradation between these are possible. For example, if 60% of the pixels are identified by the discriminator as being part of a real training image and 40% of the pixels are identified by the discriminator as being part of an image realistically generated by the generator, the image supplied to the discriminator can be evaluated with a score of 0.6 as real training image and with a score of 0.4 as an image realistically generated by the generator.

Therefore, in the evaluation of the semantic segmentation it is in general advantageous to compare, and/or to put into a ratio with each other, the number of pixels evaluated by the discriminator as belonging to a real training image and the number of pixels evaluated by the discriminator as belonging to a realistically generated image.

Because the semantic segmentation takes place at the level of the pixels, the discriminator is advantageously induced to learn fine details of the images supplied to it, on the order of magnitude of one pixel or a few pixels, and to detect the spatial agreement with the semantic training maps. On the basis of this spatial agreement, it can be checked at any size scale to what extent the discriminator is learning different semantic features of the images. If, in contrast, only a global statement of the discriminator is required, then for the cost function used for the optimization in this respect it "does not matter" from what source the discriminator provides this statement in detail. The detailed work at the pixel level is thus not "honored."

The training of a discriminator designed for semantic segmentation is, in the present application, generally better able to be monitored, because the maximum information content of the provided semantic training maps can be used immediately as ground truth for the training of the discriminator. The more already-existing labeled training data can be used in the training, the greater is the accuracy with which the finally trained discriminator works, while the costs for the labeling of the training data remain the same.

In addition, the feedback from the semantically segmenting discriminator makes it possible to train the generator to generate realistic images from a two-dimensional noise covering the entire inputted image, without spatial additional information. The ground truth that is provided for the training of the discriminator is thus also made usable, so to speak by a detour, for the training of the generator.

In a particularly advantageous embodiment of the present invention, the possible semantic meanings in the semantic segmentation supplied by the discriminator include at least the semantic meanings of the semantic training maps, as well as a classification as part of a realistically generated image. The semantic meanings of the semantic training maps can represent for example N discrete classes of objects that occur in the real training images. The classification as part of a realistically generated image can join this as a further class N+1.

In a particularly advantageous embodiment of the present invention, the discrimination parameters are optimized such that a cost function—in which, for all pixels and all possible semantic meanings, classification scores of the discriminator for the respective semantic meaning, weighted with binary indicators as to whether this semantic meaning is correct according to the training maps, are summed—assumes an optimal value. Such a cost function maps the cross-entropy of the N+1 classes, and thus brings together, in a statistically well-motivated manner, a number of decisions of the discriminator corresponding to the number of pixels in the images to form an overall assessment.

An example of such a cost function $L_D$ of the discriminator is:

$$L_D = -E_{(x,t)}\left[\sum_{c=1}^{N} \alpha_c \sum_{i,j}^{H \times W} t_{i,j,c} \log D(x)_{i,j,c}\right] - E_{(z,t)}\left[\sum_{i,j}^{H \times W} \log D(G(z,t))_{i,j,c=N+1}\right].$$

Here, E designates the formation of an expected value over all pairs of real images x and semantic training maps t, or over all pairs of noise z sampled on the basis of a random distribution and semantic training maps t. In this example, the semantic training maps t are three-dimensional tensors. Two dimensions represent the spatial coordinates i and j, which can extend up to height H or width W of the images. Class c is then coded at position i, j in tensor t in the form of a one-hot vector along the third dimension, which contains, for the class c, only one entry 1, and otherwise contains only zeros.

Thus, for each constellation of coordinates i, j and class c, $t_{i,j,c}$ indicates the probability that the assignment of the pixel to class c at this location i, j corresponds to the "truth," and this probability is always either 1 or 0. Every time that this probability is 1 but the probability $D(x)_{i,j,c}$ outputted by the discriminator for the assignment of the pixel i, j to the class c, is not 1 (which would yield zero when logarithmized), the cost function $L_D$ increases by a smaller or larger penalty amount for this "infringement," depending on the "severity." Here, in the example named above this penalty amount is weighted with a class-specific factor $\alpha_c$.

For all pixels i, j that in reality do not belong to a real training image, the probabilities $t_{i,j,c}$ for all classes c from 1 to N are equal to zero. This is then therefore a realistic image G(z, t) generated by generator G from noise z. Ideally, these pixels i, j should be identified by the discriminator, with a probability $D(G(z,t))_{i,j,c=N+1}$ of 1, as pixels that belong to a realistically generated image. When logarithmized, this becomes zero. Each probability smaller than 1 again has the result that the corresponding pixel makes a penalty contribution to the cost function $L_D$.

In a particularly advantageous embodiment of the present invention, the semantic meanings of the semantic training maps in the summation are weighted with the inverses of their frequency measured in the relevant pixels. This takes into account the circumstance that the frequencies of the semantic meanings in real training images are standardly distributed very unequally. If the semantic meanings represent for example traffic signs, then yield signs or speed limit signs occur much more frequently than for example warnings about railroad crossings, or that a roadway leads to an unsecured bank. The weighting ensures that even such rarely encountered but nonetheless very important traffic signs are appropriately taken into account in the training.

In the example named above, the weighting factor $\alpha_c$ can for example assume the form $$\alpha_c = \frac{H \times W}{\sum_{i,j}^{H \times W} E_t[1[t_{i,j,c}=1]]}$$

The training of the generator can also take place on the basis of a cost function $L_G$. This cost function $L_G$ can for example reproduce the cost function $L_D$ for the discriminator, and can assume the form $$L_G = -E_{(z,t)}\left[\sum_{c=1}^{N} \alpha_c \sum_{i,j}^{H \times W} t_{i,j,c} \log D(G(z,t))_{i,j,c}\right]$$

In a further particularly advantageous embodiment, a discriminator is selected that contains an encoder-decoder system having an encoder structure and a decoder structure. The encoder structure translates an inputted image in a plurality of processing layers into an information-reduced representation. The decoder structure further translates this information-reduced representation into an assignment of each pixel of the inputted image to a semantic meaning. Encoder-decoder systems of this type are particularly well-suited to ascertain semantic segmentations.

In a further advantageous embodiment of the present invention, the discriminator has at least one direct connection between a processing layer of the encoder structure and a processing layer of the decoder structure, bypassing the information-reduced representation. A particularly relevant portion of the information from the encoder structure can then be transferred into the decoder structure without having to pass through the "bottleneck" of the maximally information-reduced representation. In this way, the discriminator is given a u-net architecture. It brings together, in a coherent manner, global and local information that it has obtained through the stated bottleneck or through the stated direct connections.

As explained above, an important application of the training method described here is to enlarge a training data set for an image classifier, and in this way to better train the image classifier overall, starting from a specified training data set having real training images and associated target assignments to semantic meanings. Therefore, the present invention also relates to a method for training an image classifier that assigns an inputted image and/or pixels of this inputted image to a semantic meaning.

In this method, a generator is trained according to the method described above. With this trained generator, realistic images are generated from semantic maps. These semantic maps are then no longer limited to those semantic maps that were used for the training of the generator, but rather can describe any desired scenarios.

From the semantic maps, semantic target meanings are ascertained onto which the trained image classifier is to map the realistic images in each case. The target meanings can in particular include for example membership in one or more classes of a specified classification. If, for example, in the semantic map a vehicle is shown at a particular location, then the realistically generated image will contain a vehicle at this location. Therefore, the image classifier should assign the class "vehicle" to at least this image region.

A training data set for the image classifier that contains real training images and associated semantic target meanings is expanded by the realistically generated images and associated semantic target meanings. The image classifier is trained with the expanded training data set.

As explained above, the training data set can in this way be enriched in particular with realistic images of situations that were previously underrepresented in the training data set. In this way, the image classifier can be made better capable of handling these situations.

For example, training images of traffic situations that are rarely encountered but are dangerous are frequently difficult to obtain. For example, fog, extreme snowfall, or ice occur only rarely as an essential component of the situation. Other parts of the situation, such as two vehicles on a collision course, may be too dangerous to reconstruct using real vehicles.

Therefore, the present invention also relates to a further method. In this method, an image classifier as described above is trained using realistic images generated with the trained generator. With this trained image classifier, images that were recorded with at least one sensor carried by a vehicle are assigned to a semantic meaning. From the semantic meaning ascertained by the image classifier, a control signal is ascertained. The vehicle is controlled with this control signal.

Through the improved training, the accuracy of the semantic meaning provided by the image classifier is advantageously improved. Thus, the probability that the reaction of the vehicle, triggered by the control signal, to the traffic situation shown in the images is appropriate is advantageously increased.

The method can in particular be entirely or partially computer-implemented. Therefore, the present invention also relates to a computer program having machine-readable instructions that, when they are executed on one or more computers, cause the computer or computers to carry out one of the described methods. In this sense, control devices for vehicles and embedded systems for technical devices that are also capable of executing machine-readable instructions are also to be regarded as computers.

The present invention also relates to a machine-readable data carrier and/or to a download product having the computer program. A download product is a digital product that can be transmitted over a data network, i.e. downloaded by a user of the data network, for example offered for immediate download in an online shop.

In addition, a computer can be equipped with the computer program, with the machine-readable data carrier, or with the download product.

Further measures that improve the present invention are presented in the following in more detail, together with the description of the preferred exemplary embodiments of the present invention, on the basis of figures.

DETAILED DESCRIPTION OF EXAMPLE EMBODIMENTS

Figure 1:
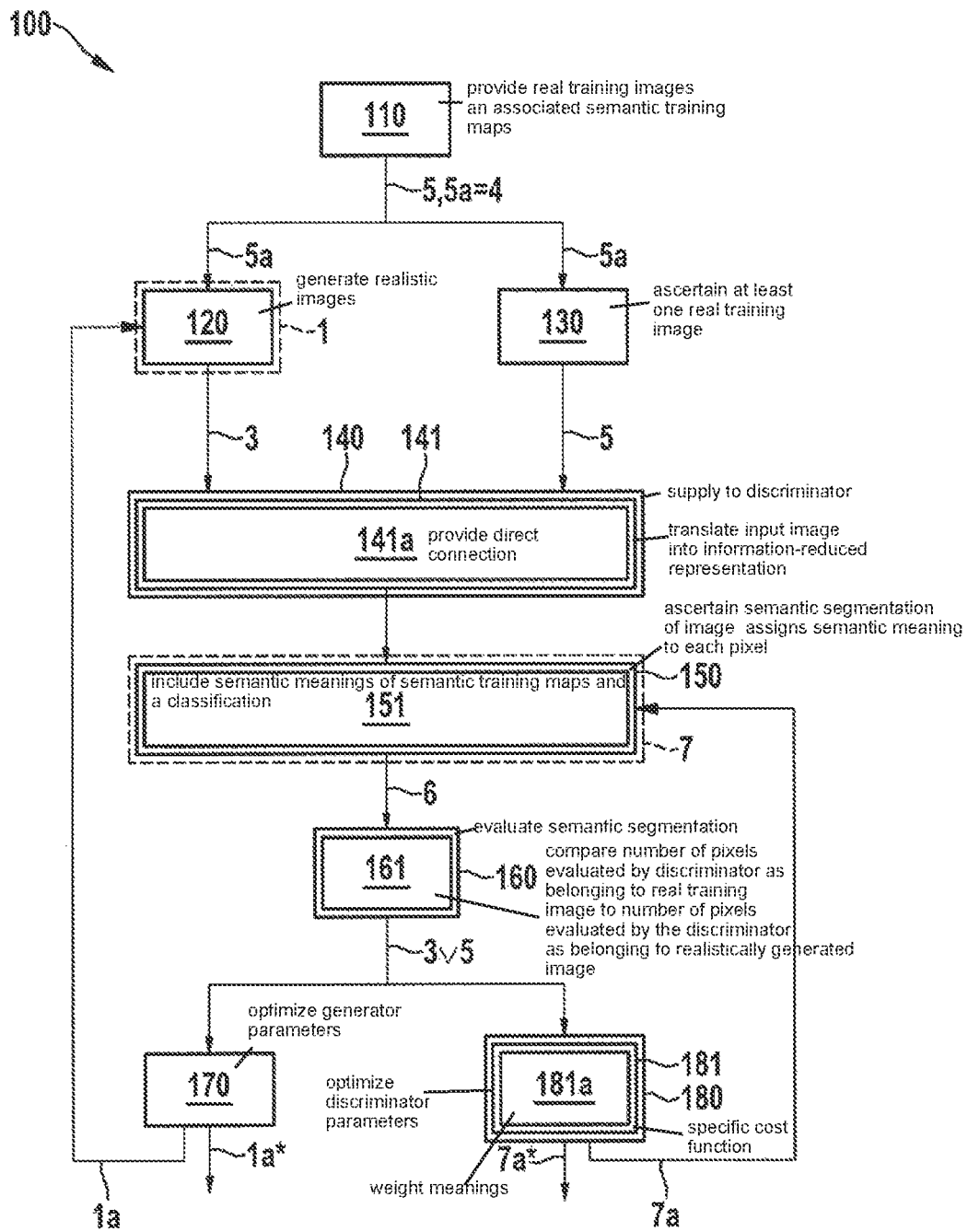
FIG. 1 shows an exemplary embodiment of method 100 for training generator 1, according to the present invention.

FIG. 1 is a schematic flow diagram of an exemplary embodiment of method 100. In step 110, real training images 5, as well as associated semantic training maps 5a, are provided. Semantic training maps 5a assign a semantic meaning 4 to each pixel of the respective training image 5.

In step 120, realistic images 3 are generated from at least one semantic training map 5a using generator 1 to be trained. In step 130, at least one real training image 5 is ascertained for the same at least one semantic training map 5a. This can be for example the training image 5 through whose labeling semantic training map 5a first came into existence.

In step 140, the realistic images 3 generated by generator 1 and the at least one real training image 5, which belong to the same semantic training map 5a, are supplied to a discriminator 7. According to block 141, this discriminator 7 can for example have in particular an encoder-decoder system. The encoder structure in this encoder-decoder system translates an inputted image, in a plurality of successive processing layers, into an information-reduced representation. The decoder structure in the encoder-decoder system further translates this information-reduced representation into an assignment of each pixel of the inputted image to a semantic meaning (4). According to block 141a, in particular for example in discriminator 7 at least one direct connection can be provided between a processing layer of the encoder structure and a processing layer of the decoder structure, bypassing the information-reduced representation.

In step 150, discriminator 7 ascertains a semantic segmentation 6 of the image 3, 5 supplied to it, which segmentation assigns a semantic meaning 4 to each pixel of this image 3, 5. According to block 151, the possible semantic meanings 4 in this semantic segmentation 6 include in particular for example the semantic meanings 4 of semantic training maps 5a, as well as a classification as part of a realistically generated image 3.

However, this does not yet include a final assessment of the inputted image as a realistically generated image 3 or as a real training image 5. This assessment, designated by the reference character 3√5 ("3 or 5"), is not ascertained until the subsequent evaluation of the semantic segmentation 6 in step 160. According to block 161, here in particular the number of pixels evaluated by discriminator 7 as belonging to a real training image 5 can be compared to, and/or put into a ratio with, the number of pixels evaluated by the discriminator as belonging to a realistically generated image 3.

In step 170, generator parameters 1a, which characterize the behavior of generator 1, are optimized with the goal that the realistic images 3 generated by generator 1 will be misclassified by discriminator 7 as real images 5. Simultaneously, or also alternating herewith, in step 180 discriminator parameters 7a, which characterize the behavior of discriminator 7, are optimized with the goal of improving the accuracy of the distinguishing between realistically generated images 3 and real images 5.

Here, according to block 181 the discriminator parameters 7a are optimized in such a way that a specific cost function assumes an optimal value. In this cost function, for all pixels and all possible semantic meanings 4, classification scores of discriminator 7 for the respective semantic meaning 4 are summed. The summands in this sum are weighted with binary indicators of whether this semantic meaning 4 is correct according to the semantic training maps (5a). Here, according to block 181a, in particular for example meanings 4 of semantic training maps 5a can be weighted in the summing with the inverses of their frequency, measured in the relevant pixels. For particular meanings 4, in addition the weight can also be set to zero. Thus, for example in training images 5 pixels may occur that are not labeled and that are therefore given the placeholder label "unknown." By setting the weight to zero, these pixels can then be completely ignored in the optimization. A conventional discriminator cannot simply do this, because it does not calculate its cost function (loss function) at the pixel level.

Figure 2:
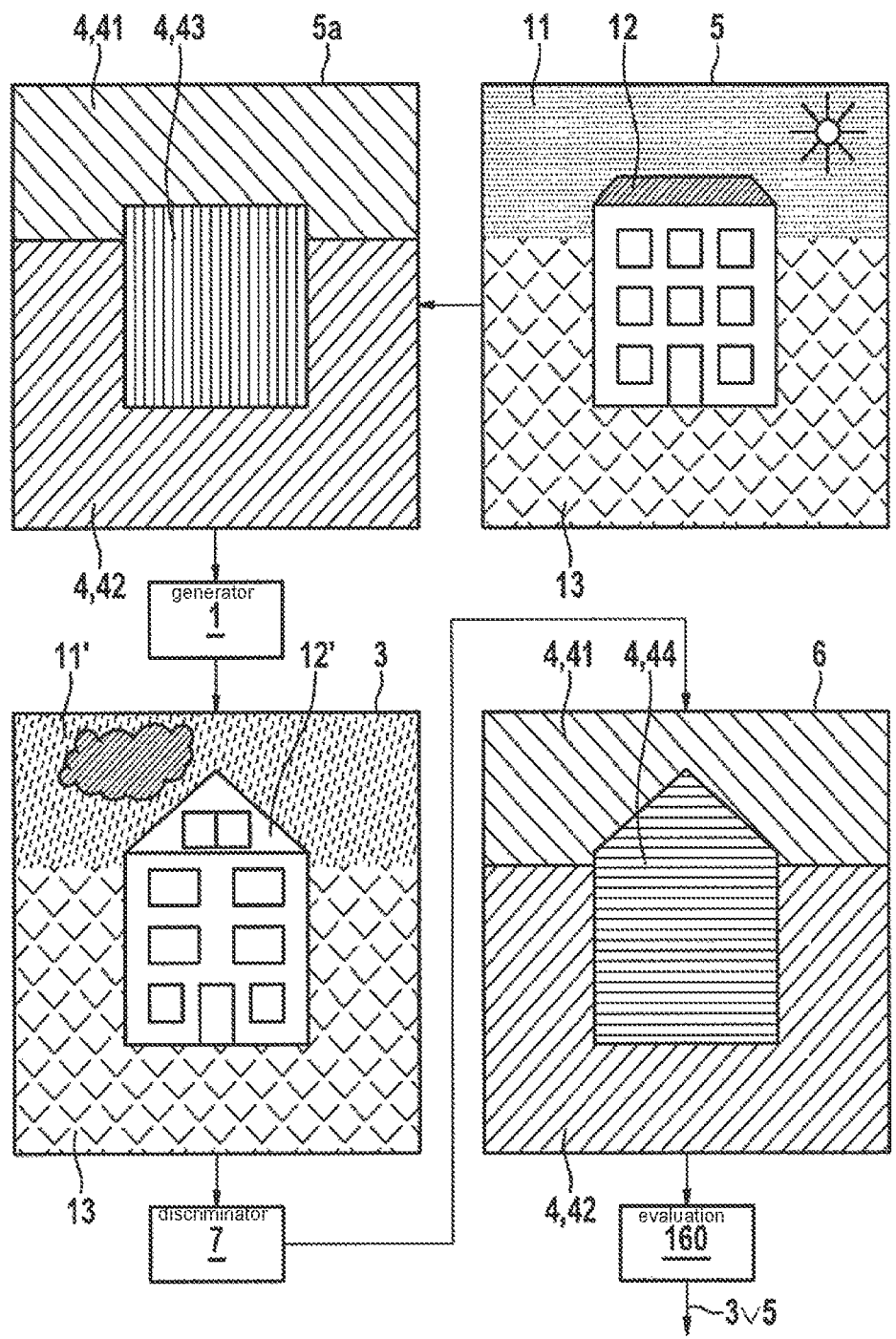
FIG. 2 shows an illustration of a semantic segmentation 6 generated by discriminator 7, according to an example embodiment of the present invention.

FIG. 2 illustrates the formation of a semantic segmentation 6 by discriminator 7, for a simple example. Semantic training map 5a contains regions having three different semantic meanings 4, namely sky 41, yard 42, and house 43. These semantic meanings were obtained by labeling a real training image 5 that contains a sunny sky 11, a house 12, and a yard 13.

Generator 1 generates a realistic image 3 from semantic training map 5a. This realistic image 3 contains a rainy sky 11' and a different house 12' than in real training image 5, but contains the same yard 13 as in real training image 5.

Discriminator 7 processes realistic image 3 to produce a semantic segmentation 6. In this semantic segmentation 6, the semantic meaning 41, "sky," is assigned to the rainy sky 11'. The semantic meaning 42, "yard," is assigned to yard 13. However, the semantic meaning 44, "part of a realistically generated image 3," is assigned to house 12', which is different than in real training image 5.

Thus, differing from a conventional discriminator, the decision as to whether a real image 5 or realistically generated image 3 is present takes place in essence at the local pixel level.

From this, with the subsequent evaluation 160, in various ways the sought decision 3√5 can be obtained as to whether the image is to be classified as a real image 5 or as a realistically generated image 3. If this evaluation 160 is based on the majority of the pixels, then the image can go through as a real image 5, because the sky 11', recognized as a sky, and yard 13, recognized as a yard, together take up more pixels than does the different house 12'. However, evaluation 160 can also for example be focused on whether the image contains, at the expected location, an object having the semantic meaning 43, "house," without taking into account a yard, a sky, or anything else. In this case, the image can be recognized as a realistically generated image 3. As explained above in the discussion of the exemplary cost function $L_D$, it is however also possible for, for example, cost function contributions that relate to semantic meanings 41-43 that occur in the real image, and cost function contributions that relate to the semantic meaning 44, "part of a realistically generated image 3," to be averaged or combined in some other way.

Figure 3:
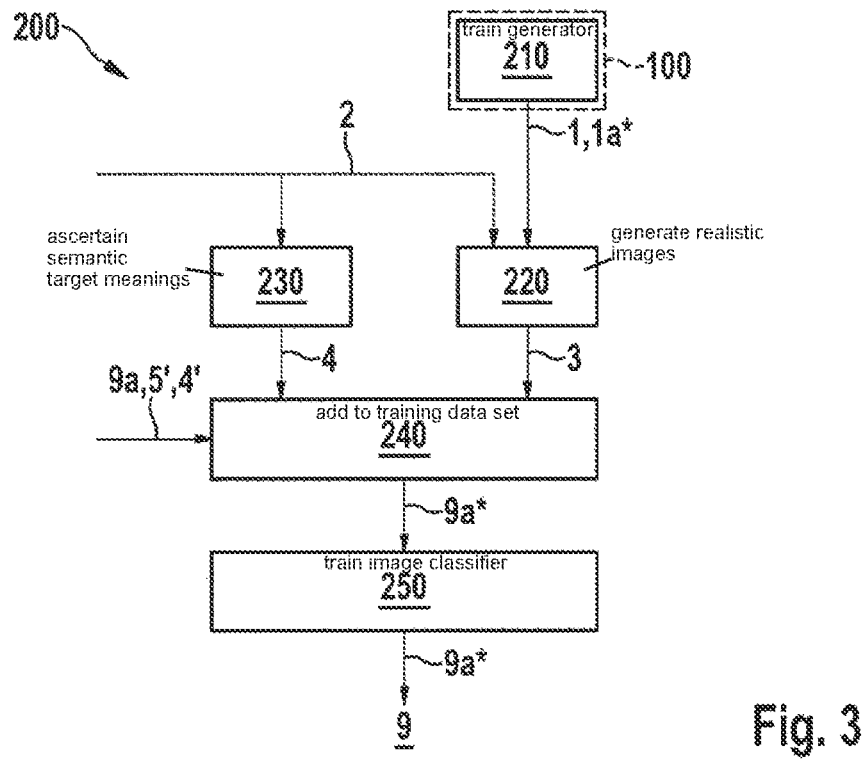
FIG. 3 shows an exemplary embodiment of method 200 for training image classifier 9, according to the present invention.

FIG. 3 is a schematic flow diagram of an exemplary embodiment of method 200 for training an image classifier 9. In step 210, generator 1 is trained with the method 100 described above. In step 220, realistic images 3 are generated from semantic maps 2 using trained generator 1. From the respectively used semantic maps 2, in step 230 semantic target meanings are ascertained onto which image classifier 9 is to map the realistic images 3, or pixels thereof.

In step 240, the realistic images 3 generated by generator 1, as well as the associated target meanings 4, are added to a training data set 9a that already contains real training images 5' as well as associated target meanings 4'. In step 250, training data set 9a* expanded in this way is used to train image classifier 9.

Figure 4:
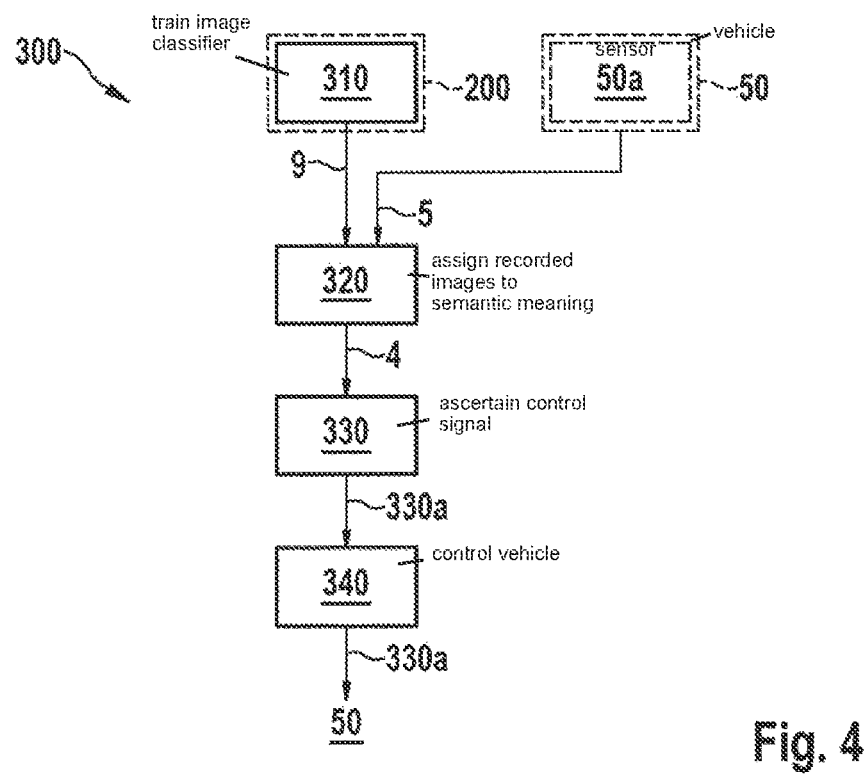
FIG. 4 shows an exemplary embodiment of method 300 with the full sequence of actions up to controlling a vehicle 50, according to the present invention.

FIG. 4 is a schematic flow diagram of an exemplary embodiment of method 300. In step 310, an image classifier 9 is trained using method 200 described above. With this image classifier 9, in step 320 images 5 that were recorded using at least one sensor 50a carried by a vehicle 50 are assigned to a semantic meaning 4. From this semantic meaning 4, ascertained by image classifier 9, in step 330 a control signal 330a is ascertained. In step 340, vehicle 50 is controlled using this control signal 330a.

What is claimed is:

1. A method for training a generator to generate images from a semantic map that assigns to each pixel of the generated images a semantic meaning of an object to which said each pixel belongs, the method comprising the following steps:
- providing respective real training images, and associated semantic training maps that each assign a semantic meaning to each pixel of the respective training image;
- generating images, using the generator, from at least one of the semantic training maps;
- ascertaining at least one real training image for the at least one semantic training map;
- supplying each image of the images generated by the generator and the at least one real training image that belong to the same at least one semantic training map to a discriminator, the discriminator ascertaining a semantic segmentation of said each image, the segmentation assigning a semantic meaning to each pixel of said each image;
- evaluating, from each of the semantic segmentations ascertained by the discriminator, whether said each image supplied to the discriminator is a generated image or a real training image;
- adjusting generator parameters that characterize a behavior of the generator with a goal that the images generated by the generator are misclassified as real images; and
- adjusting discriminator parameters that characterize a behavior of the discriminator with a goal of improving an accuracy of distinguishing between generated images and real images.

2. The method as recited in claim 1, wherein the semantic meanings assigned in the semantic segmentation provided by the discriminator include at least semantic meanings of the semantic training maps, and a classification as part of a generated image.

3. The method as recited in claim 2, wherein the discriminator parameters are optimized in such a way that a cost function assumes an optimal value, wherein in the cost function, for all pixels and all assigned semantic meanings, classification scores of the discriminator for the respective semantic meaning weighted with binary indicators of whether the respective semantic meaning is correct based on the semantic training maps, are summed.

4. The method as recited in claim 3, wherein the semantic meanings of the semantic training maps are weighted in the summation with inverses of their frequency measured in the relevant pixels.

5. The method as recited in claim 1, wherein the discriminator has an encoder structure that translates an inputted image in a plurality of successive processing layers into an information-reduced representation, and a decoder structure that further translates the information-reduced representation into an assignment of each pixel of the inputted image to a semantic meaning.

6. The method as recited in claim 5, wherein the discriminator has at least one direct connection between a processing layer of the encoder structure and a processing layer of the decoder structure, bypassing the information-reduced representation.

7. The method as recited in claim 1, wherein the evaluation of the semantic segmentation includes a comparison and/or setting into a ratio of a number of pixels evaluated by the discriminator as belonging to a real training image with a number of pixels evaluated by the discriminator as belonging to a generated image.

8. A method for training an image classifier that assigns an inputted image, and/or pixels of the inputted image, to a semantic meaning, the method comprising the following steps: training a generator to generate images from a semantic map that assigns to each pixel of the generated images a semantic meaning of an object to which the pixel belongs, the training including: providing respective real training images, and
- associated semantic training maps that each assign a semantic meaning to each pixel of a respective training image,
- generating images, using the generator, from at least one of the semantic training maps, ascertaining at least one real training image for the at least one semantic training map, supplying each image of the images generated by the generator and the at least one real training image that belong to the same at least one semantic training map to a discriminator, the discriminator ascertaining a semantic segmentation of said each image, the segmentation assigning a semantic meaning to each pixel of said each image, evaluating, from each of the semantic segmentations ascertained by the discriminator, whether said each image supplied to the discriminator is a generated image or a real training image,
- adjusting generator parameters that characterize a behavior of the generator with a goal that the images generated by the generator are misclassified as real images, and
- adjusting discriminator parameters that characterize a behavior of the discriminator with a goal of improving an accuracy of distinguishing between generated images and real images; generating, using the trained generator, first images from first semantic maps; ascertaining, for each of the first semantic maps, semantic target meanings onto which the trained image classifier is to map each the first images; expanding a training data set for the image classifier that contains real training images and associated semantic target meanings, by the generated first images and associated semantic target meanings; and training the image classifier using the expanded training data set.

9. A method, comprising: training an image classifier that assigns an inputted image, and/or pixels of the inputted image, to a semantic meaning, the training of the image classifier including: training a generator to generate images from a semantic map that assigns to each pixel of the generated images a semantic meaning of an object to which the pixel belongs, the training including: providing respective real training images, and associated semantic training maps that each assign a semantic meaning to each pixel of the respective training image, generating images, using the generator, from at least one of the semantic training maps, ascertaining at least one real training image for the at least one semantic training map, supplying each image of the images generated by the generator and the at least one real training image that belong to the same at least one semantic training map to a discriminator, the discriminator ascertaining a semantic segmentation of said each image, the segmentation assigning a semantic meaning to each pixel of said each image, evaluating, from each of the semantic segmentations ascertained by the discriminator, whether said each image supplied to the discriminator is a generated image or a real training image,
- adjusting generator parameters that characterize a behavior of the generator with a goal that the images generated by the generator are misclassified as real images, and adjusting discriminator parameters that characterize a behavior of the discriminator with a goal of improving an accuracy of distinguishing between generated images and real images;

generating, using the trained generator, first images from first semantic maps, ascertaining, for each of the first semantic maps, semantic target meanings onto which the trained image classifier is to map each the first images, expanding a training data set for the image classifier that contains real training images and associated semantic target meanings, by the generated first images and associated semantic target meanings, and training the image classifier using the expanded training data set;

assigning images that were recorded using at least one sensor carried by a vehicle to a semantic meaning using the image classifier; ascertaining a control signal from the semantic meaning ascertained by the image classifier; and controlling the vehicle using the control signal.

10. A non-transitory machine-readable data carrier on which is stored a computer program for training a generator to generate images from a semantic map that assigns to each pixel of the generated images a semantic meaning of an object to which the pixel belongs, the computer program, when executed by one or more computers, causing the one or more computers to perform the following steps:

providing respective real training images, and associated semantic training maps that each assign a semantic meaning to each pixel of the respective training image;

generating images, using the generator, from at least one of the semantic training maps;

ascertaining at least one real training image for the at least one semantic training map;

supplying each image of the images generated by the generator and the at least one real training image that belong to the same at least one semantic training map to a discriminator, the discriminator ascertaining a semantic segmentation of said each image, the segmentation assigning a semantic meaning to each pixel of said each image;

evaluating, from each of the semantic segmentations ascertained by the discriminator, whether said each image supplied to the discriminator is a generated image or a real training image;

adjusting generator parameters that characterize a behavior of the generator with a goal that the images generated by the generator are misclassified as real images; and adjusting discriminator parameters that characterize a behavior of the discriminator with a goal of improving an accuracy of distinguishing between generated images and real images.

11. A computer having a processor and memory configured to train a generator to generate images from a semantic map that assigns to each pixel of the generated images a semantic meaning of an object to which the pixel belongs, the computer configured to:

provide respective real training images, and associated semantic training maps that each assign a semantic meaning to each pixel of the respective training image;

generate images, using the generator, from at least one of the semantic training maps; ascertain at least one real training image for the at least one semantic training map; supply each image of the images generated by the generator and the at least one real training image that belong to the same at least one semantic training map to a discriminator, the discriminator ascertaining a semantic segmentation of said each image, the segmentation assigning a semantic meaning to each pixel of said each image;

evaluate, from each of the semantic segmentations ascertained by the discriminator, whether said each image supplied to the discriminator is a generated image or a real training image;

adjust generator parameters that characterize a behavior of the generator with a goal that the images generated by the generator are misclassified as real images; and adjust discriminator parameters that characterize a behavior of the discriminator with a goal of improving an accuracy of distinguishing between generated images and real images.

\* \* \* \* \*